United States Patent [19]

Aisenberg et al.

[11] Patent Number: 4,530,750

[45] Date of Patent: Jul. 23, 1985

[54] APPARATUS FOR COATING OPTICAL FIBERS

[75] Inventors: Sol Aisenberg, Natick; Martin L. Stein, Bedford, both of Mass.

[73] Assignee: A. S. Laboratories, Inc., Waltham, Mass.

[21] Appl. No.: 649,157

[22] Filed: Sep. 10, 1984

Related U.S. Application Data

[60] Continuation of Ser. No. 501,144, Jun. 13, 1983, abandoned, which is a division of Ser. No. 245,937, Mar. 20, 1981, Pat. No. 4,402,993.

[51] Int. Cl.³ .............................................. C23C 15/00
[52] U.S. Cl. .................................... 204/298; 118/405; 118/733; 118/718; 118/719; 118/72; 65/3.12; 204/192 C; 156/345
[58] Field of Search ................ 118/719, 723, 50.1, 118/405, 72, 718, 50, 733; 427/38, 39, 163, 169; 65/60.2, 60.4, 60.6, 13, 312, 3.12, 3.1, 3.3, 3.31; 204/298, 192 R, 192 C; 156/345

[56] References Cited

U.S. PATENT DOCUMENTS

| | | | |
|---|---|---|---|
| 1,710,747 | 4/1929 | Smith | 118/724 X |
| 3,326,177 | 6/1967 | Taylor | 118/719 X |
| 3,366,090 | 1/1968 | Hough | 118/723 X |
| 3,367,304 | 2/1968 | Robbins | 118/719 X |
| 3,669,065 | 6/1972 | Smart | 118/718 |
| 3,728,246 | 4/1973 | Barkhudaiov et al. | 204/298 |
| 3,904,505 | 9/1975 | Aisenberg | 427/39 X |
| 3,931,589 | 1/1976 | Aisenberg et al. | 315/3.38 X |
| 3,961,103 | 6/1976 | Aisenberg | 427/39 |
| 4,392,451 | 7/1983 | Mickelsen et al. | 118/719 X |
| 4,444,812 | 4/1984 | Gutsche | 427/255 |

Primary Examiner—Norman Morgenstern
Assistant Examiner—Bernard F. Plantz
Attorney, Agent, or Firm—Body, Vickers & Daniels

[57] ABSTRACT

Vitreous optical fibers are useful in an expanding number of technologies. A process, corresponding apparatus, and a hermetically sealed fiber of the above nature are disclosed wherein high energy ionized plasmas are used in a continuous production of a coated vitreous optical fiber. Drawn fibers are axially aligned by ambient gases discharging through high vacuum gas locks. These fibers are then continuously fed through a high energy plasma zone so that the surface of the drawn fiber is subjected to ionized bombardment. This provides plasma-milling of the fiber surface for improving the fiber strength and for superior bonding of subsequently applied coatings.

In preferred practice, a vacuum zone is used to deposit, from a plasma ion source, a diamond-like elemental carbon film onto the moving fiber. Another plasma vacuum zone may be used to deposit, over the carbon film, a very thin film of a conductive elemental metal illustratively; tin, indium and aluminum. To increase the thickness of the previously deposited metallized coating or film, the moving, pre-coated fiber is immersed in and passed through a more condensed molecular form of the metal used in the previous coating process. A molten liquid and/or vapor phase of the metal may be used in this latter process, although the former is preferred.

4 Claims, 11 Drawing Figures

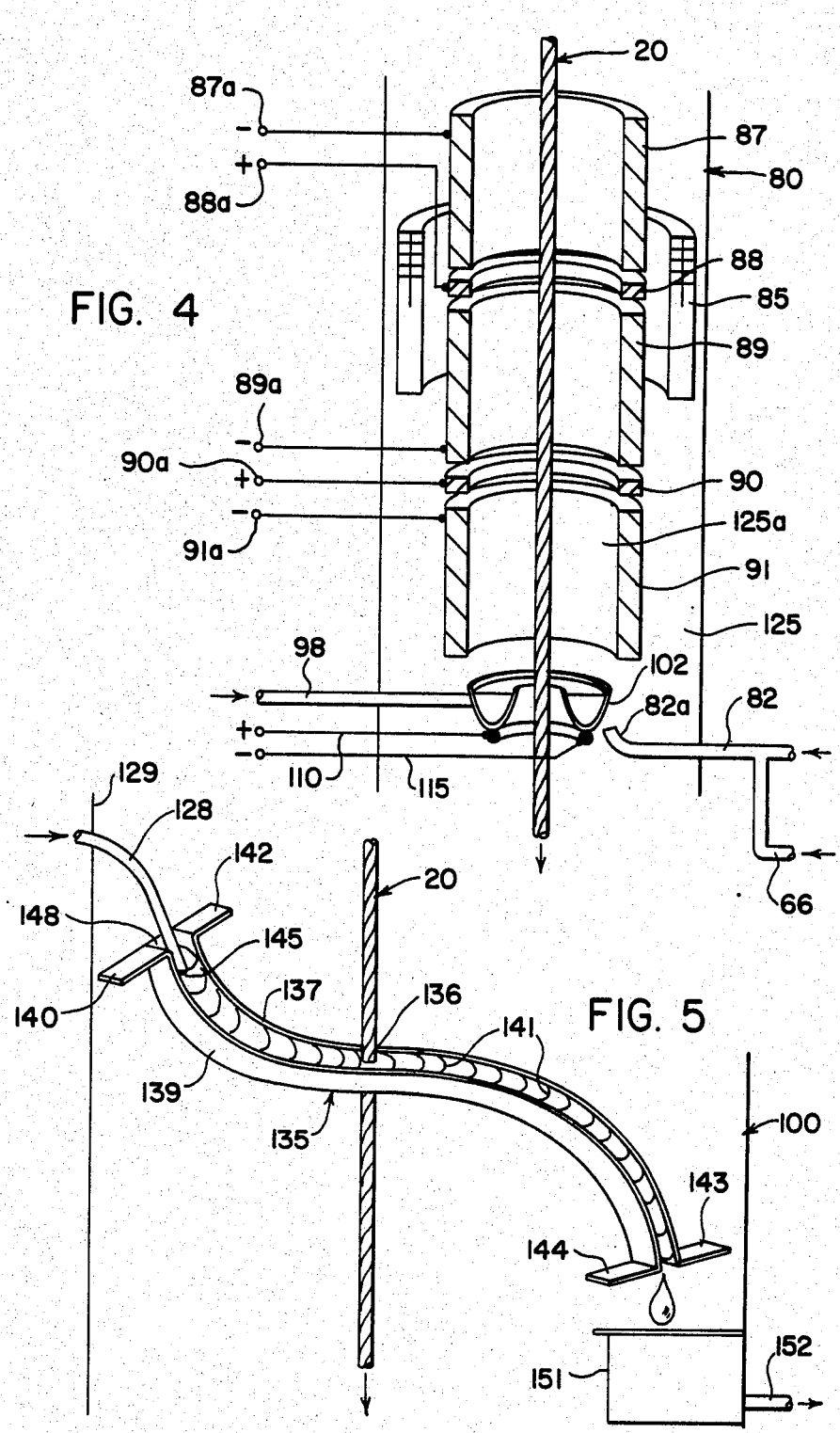

APPARATUS FOR COATING OPTICAL FIBERS

This is a continuation of application Ser. No. 501,144 filed June 13, 1983, now abandoned, which is a division of application Ser. No. 245,937 filed Mar. 20, 1981, now U.S. Pat. No. 4,402,993.

The invention relates to the art of optical transmission fibers made of vitreous materials, such as silica and various glasses, and more particularly to a process and method of coating optical fibers and the coated fibers produced thereby.

BACKGROUND OF INVENTION

In recent years, the art of fiber optics has expanded into many areas, such as communications, diagnostics, etc. Fiber optics generally involve drawn thin fibers of glass and other materials; therefore, a substantial art has developed around the production of thin glass fibers of composite nature and varying geometric structure and processes for increasing the light transmission efficiency and life of drawn glass fibers. Indeed, processes are being developed to increase ductility, tensile strength and longevity and decrease losses due to ambient conditions. The present invention relates to a process, apparatus and product resulting in improving operating characterstics of glass or vitreous fibers and other materials used in fiber optics.

It is known that humidity, moisture and corrosive gases present in atmospheres to which optical fibers are exposed can attack microscopic flaws, such as cracks or imperfections naturally occurring on the outer cylindrical surface of the fiber during continuous drawing of the fibers.

Static fatigue tests indicate that the initial strength of the freshly drawn optical fibers decline upon exposure to atmospheric conditions. For this reason, effort has been devoted to processes for applying atmosphere excluding coatings onto vitreous fibers. Such processes are expensive. More importantly, these processes result in coatings which are non-uniform, are not tightly bonded to the fiber and are subject to coating induced contamination.

THE INVENTION

The present invention relates to a process and the resulting apparatus and product comprising coating an optical fiber which hermetically seals the outer surface of the fiber uniformly and without difficulties previously experienced in the fiber optics art.

In accordance with one aspect of the invention, a coating is applied in a vacuum chamber or zone by a plasma procedure. The high energy ions and electrons as formed by vaporizing a coating material in a plasma are propelled in the high vacuum chamber. Resulting ion impingement on the surface removes both microscopic contaminants and atoms attached by weaker lattice bonds to the outer surface of the fiber. Additionally, imperfections in the curved, cylindrical surface of a fiber are removed and polished out by the high energy of the impingement of particles in the plasma. This makes possible a very tight lattice structure development in the glass-coating interface between the optical glass surface and the plasma applied coating as well as improving light transmission efficiency of the fiber.

In the preferred embodiment of the present invention a series of coating steps are employed. These steps are carried out in vacuum zones. A plasma ion-milling step is followed by plasma application of a thin layer of diamond-like elemental non-metallic material, i.e. a carbon film. Over this non-metallic film, a metal is applied by a plasma process. The preferred metal is selected from the group consisting of tin, aluminum and indium. Of course, gold could also be used. These metals are not attacked substantially by ambient conditions.

In summary, the optical fiber surface is prepared by ion milling; a diamond-like carbon film is then plasma applied; and, then a metal film is applied by a plasma. These extremely thin, but of uniform thickness, layers of selected elemental materials are all applied sequentially by plasma ion deposition techniques.

Background information on plasma ion deposition will be found in U.S. Pat. No. 3,904,505 and U.S. Pat. No. 3,961,103, which patents are incorporated herein by reference.

In accordance with the herein illustrated embodiment a metal (from molten baths by vacuum vapor deposition of atoms or by electrolysis) can be applied over the thin, plasma deposited metal film. Organic polymeric coating can also be applied over the plasma ion deposited coating or last applied inorganic coating to protect the hermetically sealed fiber. The plurality of extremely thin coatings of Angstrom magnitudes as used in the preferred embodiment of the invention provide greater flexibility than heavier coatings and are less prone to work hardening during use.

Diffusion of any impurities present on the fiber to the interface interfere with the quality of the deposited thin film. Poor definition (adhesion) at the juncture of the deposited coating and the glass fiber is substantially overcome by using the thin plasma coating of the present invention. The use of room temperature deposited layer on a glass fiber heretofore exhibited defective lattice bonds. Defective bonding may explain early efficiency losses of prior coated optical glass fibers. A coated fiber processed in accordance with the present invention has tight lattice bonding at the innermost interface.

Initial testing of coated vitreous optical fibers employing the present invention establishes key advantages. Resistance to water migration into the fibrous surface, the absence of stress induced fatigue failure from micro-bending and/or coating continuity and bond tightness have all been observed in a fiber processed in accordance with the invention.

In accordance with the invention, a vitreous optical glass fiber originating from a laser drawing tower or other vitreous fiber producing source is fed vertically into an inline continuous coating apparatus having plurality of chambers in series defining vacuum fiber treatment zones. To avoid pin holes or lint holes, the fiber is passed directly from its drawing operation downwardly into the apparatus for applying a coating or coatings. In entry to the coating apparatus, the fiber passes through a vortex gas flow shroud to remove surface attached dust or lint. The fiber is continued through a plurality of differential vacuum pumped air locks where the gas pressure about the fiber surface is reduced to less than about $1 \times 10^{-6}$ atmospheres.

The fiber is then passed through a plasma ion milling chamber where the fiber surface is subjected to a coaxial barrage of high energy or energetic plasma created ions and electrons. High velocity impingement of ions and electrons against the fiber further removes surface contaminants and effectively diminishes minor microscopic surface defects. The plasma milling chamber pressure is permitted to increase to about 25 to 50 microns in an argon environment. A hydrocarbon gas can be introduced into a plasma source in the milling chamber. A diamond-like carbon layer is thereby created on the fiber surface. In practice this carbon layer is deposited below the milling chamber which chamber includes strategically located alternately positive and negative charged and heated carbon electrodes. These electrodes surround the moving fiber thereby forming highly ionized carbon ions when a plasma is directed into this chamber. A diamond-like carbon coating is uniformly deposited from the carbon ions in either of the following chambers or separate chambers by virtue of the kinetic energy imparted by the plasma. The plasma accelerates released carbon ions under influence of the surrounding electromagnetic field and the high vacuum environment of the preferred coating chamber.

The high ion deposition energy process scrubs the fiber surface substrate by abrasive action while simultaneously depositing a film of sub-micron thickness onto the fiber. This scrubbing action enhances deposition of material by bonding the film to the freshly exposed, i.e., nascent, ion-milled surface. The strength of the bond provided by coating directly to milled glass inhibits later migration of water and/or other corrosive vapor to the interface at the glass surface. Optic fiber surfaces so polished also have increased light transmission efficiency.

To the plasma ion-milled glass surface, a coating of high purity, ductile metal can electively be first applied or be applied subsequently to the carbon coating in a thin layer of film by a plasma coating process. The metal is preferably tin, indium or aluminum which metals are known to possess excellent surface wetting properties and are oxide forming materials. The thin layer or film of metallic ductile material provides provident protection of the glass surface; however, a carbon coating prior to the metal film coating process is preferred. Deposition rates of the order of 10-20 Angstroms per second have been achieved by vaporization and sputtering techniques in the coating steps of the present invention. The carbon film can be created by introduction of a hydrocarbon gas, such as methane, into the plasma. Carbon electrodes are preferably used in combination with the hydrocarbon gas.

In the preferred embodiment, after depositing the non-metallic, elemental diamond-like carbon coating, a plasma ion process is used to provide an encapsulating film or thin coating of metal. This outer film of metal provides a further hermetic sealing coating about the surface of the fiber as it moves through the processing apparatus. This outer metal film thickness may be enhanced by increasing its weight and thickness in a non-plasma procedure as the coated fiber is passed through liquid molten metal in the apparatus. A liquefied metal bath in a vacuum zone is used to coat metal onto the pre-primed metal surface in molecular form as the fiber passes through the bath.

As the coated fiber leaves the vacuum zone where the macro-metal coating step is performed, the fiber moves downwardly through a series of vacuum pumped air locks. These locks are at the egress or exit end of the over-all apparatus and are similar to the locks through which the fiber enters the apparatus. As the downwardly moving fiber leaves the high vacuum coating zones, the fiber is held centered, or axially aligned, by the centering pressure of the flow of incoming inert gas. The inert gas (argon) surrounds the moving fiber as the pressure about the fiber returns to atmospheric. The inert gas envelope prevents defects or marks in the freshly deposited metal coating. High speed production of coated optical fiber of various geometry (section) is made possible. A similar inert gas shielding and centering arrangement provides gas flow through both the entry and exit orifice of the processing chamber. This prevents damaging engagement of the circumference of the newly coated optical fiber with parts of the chamber and prevents potential abrasion of the fiber surface. The central passages of the air locks define the axial path of the moving fiber both at the ingress to the coating apparatus and at the egress from this apparatus to maintain alignment. These passages may be coated with "Teflon" or are formed from hardened high-chrome steel. To preclude surface damage to the fiber, these centering orifices are generally of hourglass shape. Other centering linings where the orifices are plated by a plasma plating process can be provided for non-marking alignment of the fiber as it moves rapidly downward through the coating apparatus or chamber.

A macroscopic plastic coating process may be provided at the exit end of the plasma deposition stage. Such organic coatings provide a non-conductive coating to form a protective organic envelope about the fiber. Pinch rollers provide the pulling force to maintain a constant rate of vertical axial fiber movement. The completed fiber is wrapped in predetermined lengths on a take-up spool.

The primary object of the present invention is the provision of a process and apparatus for coating vitreous optic fibers which process and apparatus provide a hermetically sealed coating on the fiber without inducing deleterious impurities into coating-fiber interface.

Another object of the present invention is the provision of a process and apparatus, as defined above, which process and apparatus provides a ductile coating because of the material used and/or because of the minute thickness of the coating.

Yet another object of the present invention is the provision of a process and apparatus as defined above, which process and apparatus use plasma coating procedures and techniques for directing vaporized material against a moving fiber through use of a high energy plasma operation. The processes result in a microscopic scrubbing of the surface before and at the time of plasma coating of the moving fiber by the bombarding or impinging ions of a coating material.

Another object of the present invention is the provision of a glass fiber intended for fiber optic end use and communication, which fiber is produced by the process and apparatus defined above and has a long lasting outer protective coating.

These and other objects and advantages will be apparent from the description of the invention and using the drawing discussed in the next section.

BRIEF DESCRIPTION OF THE DRAWINGS

The above introduction has described the present invention, which will be more completely discussed and disclosed in conjunction with the accompanying drawings.

FIG. 4 is a schematic diagram showing the vacuum zone and deposition structure used to deposit a selected metal in a thin film on a fiber and by the apparatus of FIG. 1;

FIG. 5 is an enlarged pictorial view of the molten metal deposition zone of the apparatus shown in FIG. 1;

PREFERRED EMBODIMENT

Figure 1:
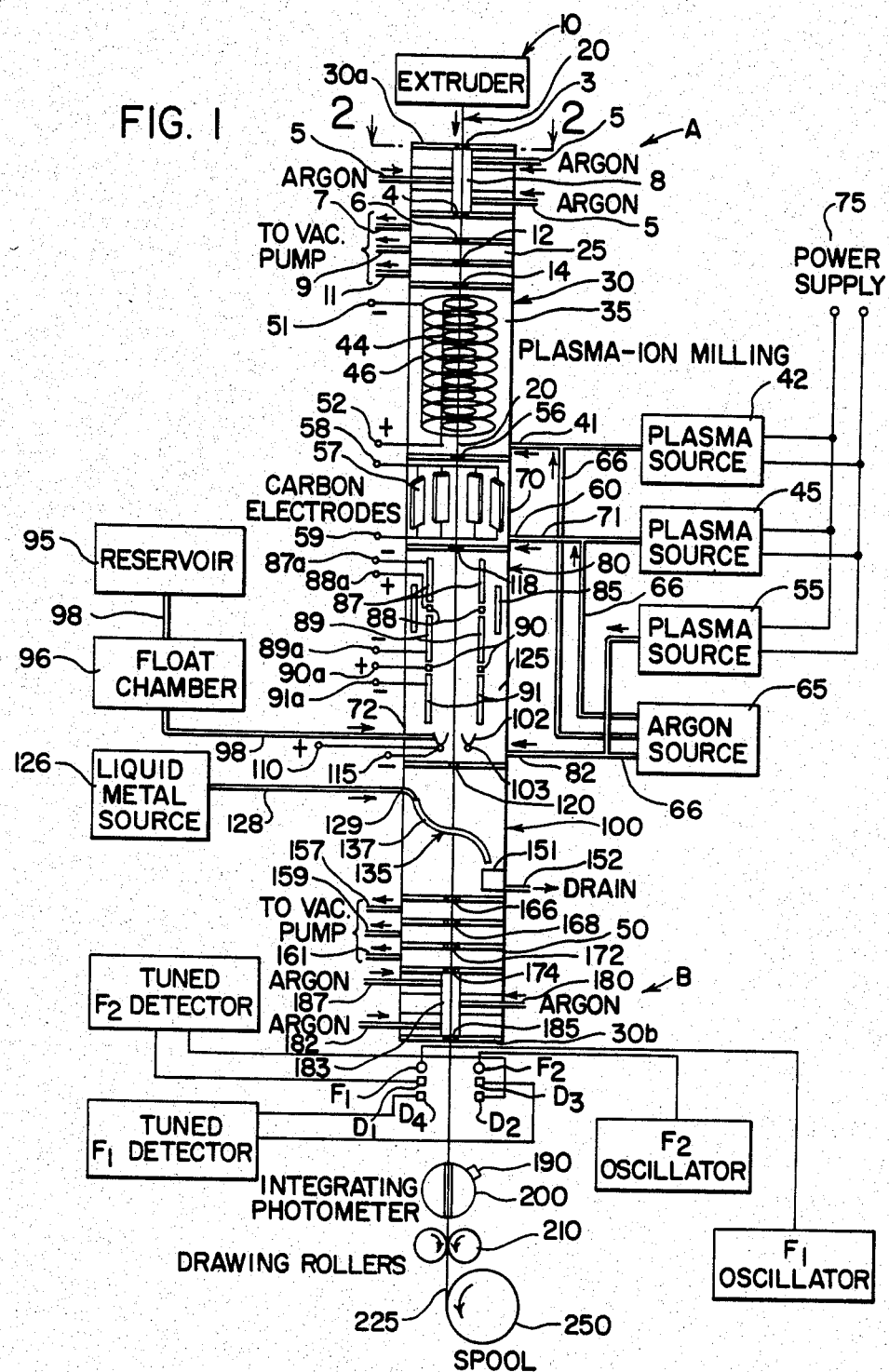
FIG. 1 is a sectional view of an apparatus providing both a process diagram and flow chart of the preferred embodiment of the invention for applying a continuous, hermetically sealed coating on surface of an optical fiber.

Referring now to the drawings wherein the showings are for the purpose of illustrating the preferred embodiment of the invention only, and not for the purpose of limiting same, FIG. 1 shows an apparatus and method for depositing a coating on a moving vitreous or glass optical fiber 20. The optical fiber 20 is formed in accordance with standard practice such as extruding at a rate in the general neighborhood of two meters per minute from a molten mass by an extruder 10. The optical fiber from the extruder is directed through an appropriate protective shroud to the entrant end 30a of coating apparatus or chamber 30. Fiber 20 passes through chamber 30 at substantially the same rate as it issues from extruder 10. Within apparatus 30 between the inlet end 30a and the outlet end 30b, fiber 20 is substantially unsupported; therefore, the length of apparatus 30 must be selected so that the weight of the fiber does not cause necking down or drawing of the moving fiber. To prevent this action, fiber 20 is essentially hardened into the final shape as it leaves the extruder and passes through an appropriate protective shroud to the entrant end 30a of apparatus 30. Within the apparatus, one or more very thin coatings are applied to the outer surface of fiber 20.

One or more coatings are provided by use of a plasma depositing technique wherein the material to be deposited is vaporized and propelled at high speeds and energy against the surface of fiber 20 as it moves vertically downwardly through apparatus 30 between the input ends 30a and the output end 30b. Also, as will be explained later, these thin films which are deposited by plasma techniques can be reinforced and encapsulated by an outer protective layer of metal formed by passing fiber 20 through a liquid or molten bath of metal. Also, the completed inorganic coatings can be protected by a subsequent organic plastic encapsulating process (not shown).

This invention is directed primarily to the concept of bombarding moving fiber 20 with highly energized ions for the purpose of milling and rendering the surface smooth and impurity free and then applying thereto a selected first coating to the so-milled surface in a manner which enhances the interfacial bond between the initially deposited then film coating and the freshly milled surface of the fiber. The initial thin film deposited by the plasma technique has a thickness of the order of from about five to less than one thousand and preferably from about ten to less than about five hundred Angstroms.

Figure 2:
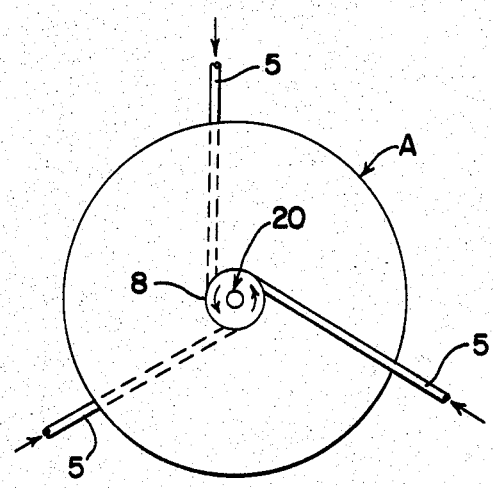
FIG. 2 is a cross-sectional view generally along line 2—2 of FIG. 1 showing the radial air flow unit for centering and stabilizing a fiber being processed in accordance with the preferred embodiment of the present invention.
Figure 6:
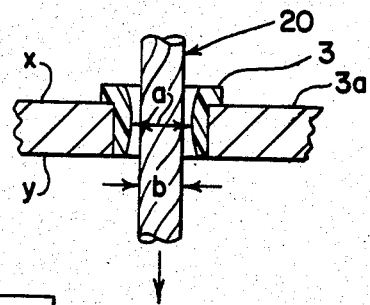
FIG. 6 is a sectional view of a fiber guide orifice as used in the apparatus of FIG. 1.

Referring more particularly to FIG. 1, fiber 20 passes from extruder 10 and then enters through insert orifice 3 in plate 3a as best shown in FIG. 6. Plates similar to this are used throughout the length of apparatus 30 to provide vacuum barriers and define vacuum chambers or zones at various axial positions within apparatus 30. Below upper plate 3a is provided a fiber centering and stabilizing unit A which incorporates three circumferentially spaced gas inlets 5 directed to an internal cylindrical bore 8 through which fiber 20 passes. Argon or other inert gas is drawn through inlets 5 from a gas source creating a vortex of gas within tube or bore 8 so that the fiber is maintained by resultant gas forces thereby generated in a central position within centering and stabilizing unit A. Inlets 5 may be tangential to bore 8 as shown in FIG. 2. The rapid swirling gas surrounding incoming fiber 20 prevents the formation of oxidation products on the surface of fiber 20 as it enters apparatus 30 and also tends to dislodge and remove deleterious contaminates such as lint and loose material. Glass fiber 20 descends vertically through apparatus 30 which includes a series of orifices 4, 6, 12 and 14 which are used to define multi-state differential air lock 25 into separated stages which are evacuated by vacuum pumps connected to lines 7, 9 and 11. As will be described later, a similar air lock and centering unit B is provided at the exit end 30b of apparatus 30 for the purpose of maintaining fiber 20, centered and axially aligned within apparatus 30 as it is transported and coated in accordance with the present invention. Since there is a possibility of fiber 20 frictionally engaging interiorly of an orifice such as 3, 4, 6, 12 or 14, these orifices are shaped, in the preferred embodiment, as illustrated in FIG. 6. The interior bore of these snap-in orifices can be altered to accommodate different diameter fibers and/or to meet the added clearance required as greater or lesser number of coatings are deposited on the fiber. Interior surfaces of these orifices are coated with Teflon, hardened chrome or other hardened, heat resistant friction-reducing surface material. The internal orifice diameter "a" shown in FIG. 6 is not substantially greater than the diameter "b" of fiber 20. Minor clearance is thereby provided which permits stabilizing gas flow and centering as pressures to be maintained between opposite sides x, y of plate 3a and against the periphery of fiber 20. In this fashion, a series of similar orifices 4, 6, 12 and 14, as shown in air lock 25, are used to create a vacuum on the downward side of 14 of air lock 25. Of course, orifice clearances at the exit end may be slightly enlarged to compensate for heavier liquid coating of molten metal applied to fiber 20 as it passes through the last orifice 30b of apparatus 30 in a manner to be described later. After fiber 20 passes through orifice 3 it continues to move downwardly through apparatus 30 by the pulling action of pinch rolls 210 which rolls are rotated at a speed suitable for pulling fiber 20 downwardly through apparatus 30 in a manner to keep it vertical and taunt during various processing steps sequentially performed altering the outer surface of fiber 20.

Figure 3:
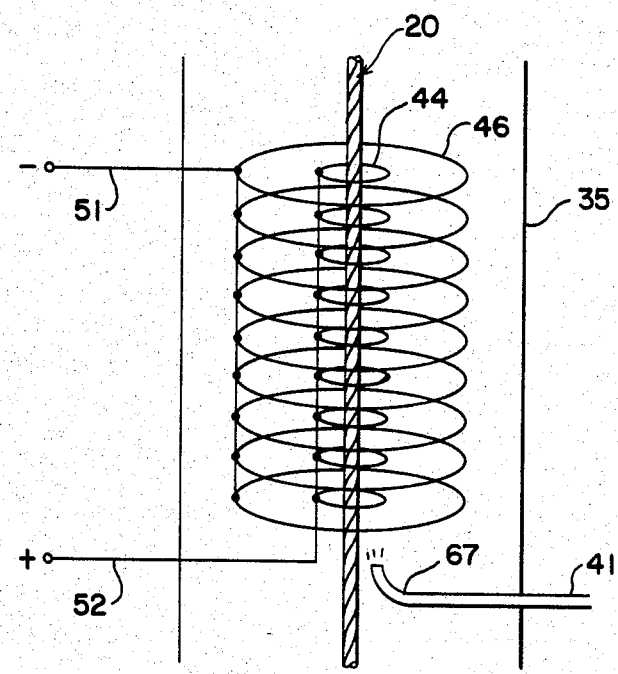
FIG. 3 is a schematic diagram showing in more detail the plasma ion milling section of the apparatus illustrated in FIG. 1.

After leaving orifice 3, fiber 20 passes through argon or nitrogen vortices created by gas being pumped into inlet 5 of vertical bore 8. The inert gas reduces possibility of oxidation and also forms a vortex moving around fiber 20 to hold the fiber centered in bore 8 and in alignment to enter into and through orifices 4, 6, 12 and 14 of air lock 25 as has been previously described. Evacuation pumps or vacuum pumps connected to lines 7, 9 and 11 reduce the atmospheric pressure about the fiber to a vacuum condition having a pressure less than about $1 \times 10^{-6}$ atmospheres, in one preferred embodiment. The so reduced atmospheric pressure persists in downwardly positioned zone or chamber 35 through which fiber 20 passes without contacting any structure within vacuum zone or chamber portion 35. Air lock 25 together with the lower air lock 50 which will be described later, maintains a vacuum within the over-all chamber 30 of preferably less than about $1 \times 10^{-6}$ atmospheres. In vacuum zone 35, uncoated optical fiber 20 passes vertically downwardly to be contacted and surrounded by an upwardly moving plasma of ions which is created by an appropriate plasma source 42 which activates ions of argon from an argon source 65 schematically connected with source 42 by line 66. As schematically illustrated in FIG. 3 argon ions are directed in an appropriate manner indicated as nozzle 67 into zone 35 through entry 41. The high energy of the argon plasma from source 42 which is derived through power lines 75 is directed axially through electrical coils 44, 46.

Coils 44 and 46 create a concentrated axially extending magnetic field vertically upwards along moving fiber 20 tending to stabilize the fiber but primarily to force the plasma to move rapidly upwards through zone 35 in a direction counter current to the downward movement of fiber 20. The vigorous attack of the ions and electrons within the plasma moving through concentrating coils 44, 46 causes a milling action on the outer cylindrical surface of fiber 20 which frees any detritus from the surface. In addition, this plasma milling action caused by bombardment and impingement of high energy, small weight particles of infinite number against the surface of downwardly moving fiber 20 provides a more perfectly cylindrical outer surface in a manner which polishes out minor surface imperfections from the draw including microscopic cracks, hills and dales. As the highly energized plasma flows coaxially through electrical coils 44, 46 energized by a power source (not shown) through a negative voltage at lead 51 and a positive voltage at lead 52. The field generated by the coils accelerate ions as they move to fiber 20 and as they move along fibers 20 in counter-current direction. There is no physical contact caused by the magnetic and electric forces created by coils 44, 46.

As will be explained later, plasma sources 45, 55 and 65 are standard arrangements for generating the plasma and are each powered by an appropriate power supply illustrated as jointly served by power supply 75. Argon for use in the formation of ions in the plasma is supplied in the plasma generator in accordance with known practices illustrated schematically in FIG. 1 through line 66. Plasma ion milling zone 35 provides a more perfectly cylindrical and clean outer surface very important to the efficiency in use of fiber optics and better "definition" of the lattice bonding with coatings about to be applied. By bleeding in a hydrocarbon gas into the plasma of zone 35, one may begin to create a thin film of a special crystal form carbon on the outer surface of fiber 20.

In the preferred embodiment of the invention, a separate stage or processing zone is employed for the step of plasma deposition of such carbon film onto the outer freshly milled fiber 20 surface. In accordance with the concept of using separate plural stages, hydrocarbon gas, in conjunction with argon if desired is used in plasma creating generator or source 45. The highly energized gas flow would then be broken down by the high temperature of the plasma creating device 45 to argon and carbon ions which would then impinge in equal and uniform concentration about the outer surface of fiber 20 after exit from zone 35 through orifice 56, similar to orifice 3 shown in FIG. 6. Zone 70 is the principal carbon coating zone and is entered through and below orifice 56 of apparatus 30. Upper vacuum pump lines 7, 9 and 11 as well as lower vacuum pump lines 157, 159 and 161 maintain reduced inert gas pressure within carbon depositing zone 70.

Carbon depositing zone 70 withdraws plasma from plasma 45 through line 60. In the illustrated embodiment, zone 70 includes a plurality of carbon electrodes 57 surrounding downwardly moving fiber 20. Electrodes 57 are equally spaced around the fiber to provide a source of free carbon atoms and ions. Power essential is provided through an appropriate power supply (not shown) to exterior leads 58, 59. Although carbon electrodes 57, are shown, for convenience, relatively widely spaced circumferentially from fiber 20, they are in actuality very close thereto. As plasma from source 45 is directed into chamber 70, electrodes 57 are electrically heated through leads 58 and 59 to glowing to emit ions. They could be arranged as spaced positive and negative electrodes to sputter carbon ions uniformly about and against the downwardly moving fiber surface. These free emitted or sputtering ions bombard, hit and attach to downwardly moving fiber 20 to provide a diamond-like form of carbon coating which is of less than micron dimension thickness. In practice, the carbon atoms may also be obtained and reinforced from hydrocarbon gas which is decomposed into carbon ions and through plasma source 45 so that the highly charged carbon ions will be carried as part of the plasma into zone 70 and forcibly deposited on the surface of downwardly moving fiber 20.

In this manner, a diamond-like elemental form of carbon coating is provided about the surface of fiber 20 in vacuum zone 70. Deposition of carbon ions onto the downwardly moving fiber in vacuum zone 70 provides a rate of about 10–20 Angstroms of thickness per second. Methane is illustrative of a suitable hydrocarbon gas which may be used for creating the elemental carbon propelled in plasma ion form against and coats the surface of downwardly moving fiber 20. Leads 58, 59 provide energy for causing electrodes 57 toglow so that they will release carbon atoms to reinforce the plasma ion density initiated through plasma source 45 and line 60 into zone 70 in an appropriate manner. Argon from source 65 may be used to fortify the plasma forming operation and as an auxilliary carrier to introduce deposition coating material into the plasma at a greater rate.

In zone 70, it is possible to provide carbon atoms in a substantially vapor or gaseous form or as a component of gaseous additive hydrocarbon material for subsequent decomposition into the appropriate ion by means of the plasma energy from appropriate plasma source 45. Such action may be referred to as plasma pyrolysis. Use of a hydrocarbon gas aids in the desired deposition of a special type of carbon crystal film on the downwardly moving filament since the ions of the plasma thereby being formed are directed against the moving filaments are carbon ions and hydrogen ions. The hydrogen ions colliding or bombarding the downwardly moving fiber or filament assist in removing residual oxygen ions that may possibly remain on the outer periphery of downwardly moving fiber 20. Consequently, bombardment of fiber 20 in zone 70 by hydrogen ions from plasma pyrolyzed hydrocarbon is advantageous.

It has been established that the relatively thin film of carbon that is deposited onto the downwardly moving glass filament or fiber is crystalline in form and the deposited carbon crystals have properties similar to that of diamond. The observed points of similarity between crystalline carbon film formed in accordance with the present invention using a plasma beam to direct carbon ions against the outer surface of the moving fiber are: (a) the same general index of refraction, (b) high electrical resistivity, (c) transparency in the visible light range, (d) high di-electric constant and (e) the ability to abrade glass. The diamond-like carbon film also has a high resistance to hydrofluoric acid etching. Since the thin carbon layer provided in accordance with the present invention has properties known to the diamond crystal form of carbon, it is termed diamond-like for distinction in this application. One advantage of the resulting carbon film deposited in zone 70 of apparatus 30 found is that the crystalline carbon film is resistant to sodium ion diffusion which tends to occur at elevated temperatures.

This latter property is again in agreement with those properties anticipated for a densely packed diamond-like carbon structure having packed grain boundaries and internal crystalline resistance to the motion of relatively large alkali ions. Stable insulating and semi-conductor carbon films can be produced on the outer cylindrical surface of downwardly moving fiber 20 by employing the plasma depositing step in vacuum.

Although the formation of a thin carbon, diamond-like film on moving glass fiber 20 is preferred and is illustrated in FIG. 1, it is within the scope of this invention to deposit a selected metal directly onto the cleaned, milled surface of the fiber without the intermediate film of plasma deposited carbon although such initial film deposit as described is preferred. As fiber 20 passes downwardly from and out of zone 70 it is uniformly coated with a dense diamond-like plasma film which tightly adheres to the outer cylindrical surface of the fiber. An electron microscopic examination of the cross-section of fiber 20 at this point in the process discloses a high order of finite definition of the polished circular exterior interface of the fiber and the interior circumference of the diamond carbon film. A relatively fine line interface definition is illustrated which is indicative of a tight lattice structure between the carbon film and the outer polished surface of glass or vitreous fiber 20. As so far described, fiber 20 includes an outer layer or film of carbon which is deposited by vaporizing molecules of carbon or by sputtering carbon molecules from electrodes 57 into a plasma ion charge onto the surface of downwardly moving fiber 20. It has been indicated above that this carbon coating may be eliminated in certain instances.

Whatever that election may be, following the process of FIG. 1, crystallized carbon coated fiber 20 enters into vacuum zone or chamber portion 80, best shown in FIG. 4.

A high energy plasma from source 55 is provided to zone 80 through lines 82 and 66. Argon in line 66 is ionized for the purpose of creating the plasma beam which is directed axially along fiber 20 in zone 80 by an appropriate arrangement schematically illustrated as nozzle 82a as was the case with nozzle 67. Nozzles 67 and 82a are schematic in nature and are used only to illustrate that a plasma beam or stream of plasma is directed axially around and along downwardly moving fiber 20.

Zone 80 is employed for the purpose of plasma ion deposition of a thin film of ductile, elemental metal onto the outer surface of the fiber. Plasma from source 55 enters into zone 80 in which a vacuum in the general vicinity of as low as about $1 \times 10^{-6}$ atmospheres is desired. Zone 80 is interiorly provided with magnetic coil 85 surrounding opposite polarity electrodes 87, 88, 89, 90 and 91. These electrodes are formed from a selected metal to be deposited. Indium, tin and aluminum are representative. The electrodes sputter metal at their intermediate gaps and are preferred over the electrode arrangement in zone 70. Coil 85 generates an electromagnetic field from current originating in an external power source, not shown. Plasma from source 55 enters upwardly through 82 into zone 80 and the magnetic field within coil 85 which accelerates the rate of movement of the plasma in an axial orientation. The plasma which is formed with an inert gas, such as argon, vaporizes metal from electrodes 87-91 so that the free ions of this metal impinge upon and bombard moving fiber 20 to form a thin plasma deposited metal layer thereon as the glass fiber moves vertically downwardly as shown in FIG. 4. Although metal ions may be employed, it is possible in the alternative and for some ends to deposit ions of other materials such as silicon carbide or silicon nitride in zone 80 as shown in FIG. 4.

For illustrative purposes and as a "best" mode presently known, an indium coating is applied by the plasma beam in zone 80. In this instance, electrode 87, 89 and 91 are formed from indium and connected to external cathodes 87a, 89a and 91a. A series of corresponding anodes 88a, 89a are connected to the interior indium electrodes 88 and 90 to produce a supply of indium ions. These electrodes also surround moving fiber 20 and are equidistant therefrom. This same electrode arrangement could be used as is used in zone 70 for providing carbon ions. As in zone 70, ions are provided by heated or sputtering electrodes formed from the material of the ultimate ions which are to be bombarded and propelled against the moving fiber 20 for coating purposes. An electrical discharge takes place between the circular electrodes 87-91 through which fiber 20 passes so that the plasma beam from nozzle 82a picks up the volatilized ionized indium atoms and propels these in a plasma form against fiber 20. Another supply of indium ions can be provided as shown. There is provided a reservoir 95 of molten indium. This reservoir directs liquid indium at a controlled rate through insulated supply line 98 into vacuum chamber 80. In this manner, taurus shaped, walled molten metal receiving vessel 109 is filled with molten metal, in this instance, indium.

In the alternative, it is possible to provide molten metal into vessel 102 in another manner such as a spool of indium wire resistance heated by electricity to provide a molten supply of indium that is directed into reservoir 102. Use of such means would allow one to replace reservoir 95 and float chamber 96. Such alternative means is disclosed in the liquid metal source as is illustrated by source 126 used below in lower coating zone 100 of chamber 30 in a manner to be described later.

Liquid metal in vessel 102 is maintained in a molten state by heat generated by resistance coil 103 connected across power supply lines 110, 115. Thus, coil 103 maintains indium in vessel 102 in a molten condition which increases its vaporization rate, also enhanced by vacuum conditions within chamber 30 and particularly zone 80. Increased vapor pressure of the molten metal within the vacuum chamber allows rapid evaporation of molten metal atoms from the surface of vessel 102 to supply thereby a large number of charged indium ions to the plasma beam from schematically represented nozzle 82a.

During the time which elapses as vitreous optical fiber 20 passes downwardly from upper orifice 118 of zone 80 to the aligned lower orifice 120, the fiber is practically continuously bombarded with high velocity, high energy activated ions and atoms of the vaporized electrically charged metal atoms, (indium) from electrodes 87–91 and vessel 102. Ions and atoms of indium are formed in part by sputtering and vaporization of atoms from the glowing indium electrode material into the surrounding, evacuated space 125. In addition, ions and atoms of metal, as noted above, are vaporized into space 125 of zone 80 from molten metal within receptacle 102. The magnetic field generated by coil 85 is used to concentrate and accelerate the plasma beam to drive it in proximity to the downwardly moving fiber. Consequently, magnetic field caused by coil 85 permits the metallic plasma ion source to operate at a lower pressure and this field aids in maintaining the plasma in a columnated mode surrounded by the indium electrodes. In this inner cylindrical zone 125a there is a uniform high metallic ion density that completely surrounds the exterior surface of downwardly moving fiber 20. Effective impingement energy of the ions is increased as they are drawn into and against the fiber surface to insure uniform deposition of a metal film in the preferred practice about the previously provided carbon film. The axial high density supply of metal ions which are concentrated around the moving fiber by the magnetic field achieve a higher deposition rate than would be achieved in the absence of the magnetic columnating field. This high density caused by surrounding the film with a restricting pattern of electrodes in connection with an outer magnetic coil to drive the ions still tighter against fiber 20 results in superior deposition quality even though the filament is formed from a glass and is non-conducting. Thus, this procedure of concentrating the ions in tubular zone 125a forces ions of metal onto the surface of fiber 20 even though the fiber is not originally electrically conductive. When fiber 20 moves from zone 80 through orifice 120, it is uniformly coated with a thin film of metal. In preferred practice, this metal encapsulates an inner thin film or layer of carbon in somewhat diamond-like form. Irrespective of whether or not carbon deposition is used, the metal coated fiber has a ductile outer coating which protects the inner glass fiber from environmental conditions.

In the preferred embodiment of the invention as shown in FIG. 1, vitreous optical fiber 20 is further processed to provide a layer or coating having a thickness of greater magnitude than one resulting from the initial plasma created metal coating. This is done, in the illustrated embodiment of the invention, by drawing fiber 20 through a liquid body or mass of the same molten metal initially deposited onto fiber 20 in zone 80. This liquid or molten mass of metal thus increases the thickness of the previous plasma applied metal coating by addition of an originally dense molecular molten liquid form or state of metal deposited in the order of microns of thickness to the previously deposited film which is of the order of Angstroms in thickness. To accomplish this, a variety of alternative structures are useful; however, for illustration there is here provided a vacuum zone 100 below aligning orifice 120.

Molten metal from source 126 shown in FIG. 1 includes an insulated pot containing molten indium. A ceramic tube 128 directs molten indium to zone 100 of chamber 30 through wall portion 129 as best shown in FIG. 5. A capillary device 135 including spaced ceramic rails 137, 139 allows the flow of molten indium between the rails and transversely across the path of downwardly moving fiber 20. The capillary distance between rails 137, 139 are determined by a plurality of spacer elements 141. These rails are also fixedly secured by an appropriate arrangement schematically illustrated tabs 140, 142, 143 and 144. An appropriate arrangement, not shown, is provided for electrically heating rails or walls 137, 139 to assure molten indium will pass along the shape determined by the contour of the rails to provide a supply of molten metal from conduit 128 into 135 and a position intersecting the downward path of fiber 20. Referring to FIG. 5, by controlling the temperature and viscosity, liquid indium from ceramic tube 128 enters the formed capillary channel 135 at exit end 145 of tube 128 and entrant end 148 of the capillary channel. At or near the central, generally horizontal position of channel 135, the distance between rails 137 and 139 is greater than the diameter of fiber 20 (the diameter of a typical optical fiber is about 3 to 4 mils or about 75 to 100 millimicrons) which fiber descends through molten metal at the central area 136. This impact causes direct contact wetting of the surface of fiber 20 by metal at area 136. Consequently, fiber 20 picks up additional metal to increase the thickness of the initial metal deposited surrounding fiber 20. Since the originally mentioned vacuum is substantially maintained in zone 100, there is insufficient oxygen to permit oxidation of the coating metal in said zone, or the formation of slag on the freshly deposited metal. In this manner, an additional film of the order of microns in thickness can be added to the metal previously plasma deposited in zone 80 of apparatus 30. By means of this two stage operation, a relatively thick hermetically sealing metal coating can be provided without reducing substantially the rate of movement of the fiber through chamber 30. Use of a molten coating reduces the vertical height of apparatus or chamber 30 required while permitting a relatively thick homogeneous layer of metal formed from a tightly bonded inner plasma deposited film and an outer liquid metal immersion applied portion. Metal flowing through capillary channel 135 is drained from zone 100 by an appropriate arrangement as schematically illustrated as a receiving a receptacle 151 and vacuum drain line 152. The total thickness of metal thereby deposited about fiber 20 is in the order of about 20 microns. More or less metal can be deposited in zone 100 to meet any preselected specification. The 20 micron thickness which is deposited in zone 100 is used in the preferred embodiment. As can be seen, when depositing film by plasma in zones 70 and 80 and possibly zone 35 the thickness is of the order of Angstroms. Microns of metal thickness are added in zone 100. This is the difference in kind and magnitude of film thicknesses which may be essential for certain optic fiber end uses.

Although not shown, any number and length of plasma coating stages may be provided by design within apparatus 30. These zones might well take the physical form as schematically illustrated in zone 80, shown best in FIG. 4; however, other forms are not precluded such as have been shown and described in zone 35 or zone 70. It has also been suggested that where costs warrant use a very thin metallic elemental gold film be deposited by the plasma ion technique herein described with a thickness from above five to 200 Angstroms or more following the special carbon deposition of zone 70 or electively, directly about the plasma-milled optical fiber 20 after leaving zone 35.

Referring now to FIG. 1, air lock 50 is substantially identical to air lock 25 as previously described above, but is at the exit end 30b of the over-all apparatus or chamber 30. Air lock 50 includes one or more vacuum pumps (not shown) connected by vacuum lines 157, 159 and 161 to the spaces between plates containing lined centering orifices 166, 168, 172 and 174 through which the now-coated optical fiber 20 passes. Consequently, vacuum in prior zones 35, 70, 80 and 100 can be maintained at desired levels between air locks 25 and 50 as shown in FIG. 1. Below the plate including orifice 174, there is provided a fiber centering and aligning radial air flow unit B having the same basic structure and function as Unit A shown in FIG. 2. In this instance, unit B of airlock 50 includes argon gas inlet or input lines 180, 181 and 182 which are directed to the central tube 186 through which coated optical fiber 20 passes. After the fiber leaves lower orifice 185 at the exit end of tube or passage 180, it re-enters normal atmospheric pressures and is returned to normal ambient air conditions at exit end 30b. Argon is forced outwardly through orifice 185 in a manner similar to the outward flow of argon from orifice 3 at A so that contamination and oxygen is barred from entry and the vacuum is maintained with the over-all apparatus 30.

To control the uniform movement of optical fiber 20, there is illustrated in FIG. 1 an optical system for centering fiber 20 within the described orifices and bores and detecting and damping any fiber vibration created by drawing the fiber by pinch rolls 210 through chamber 30.

Figure 7:
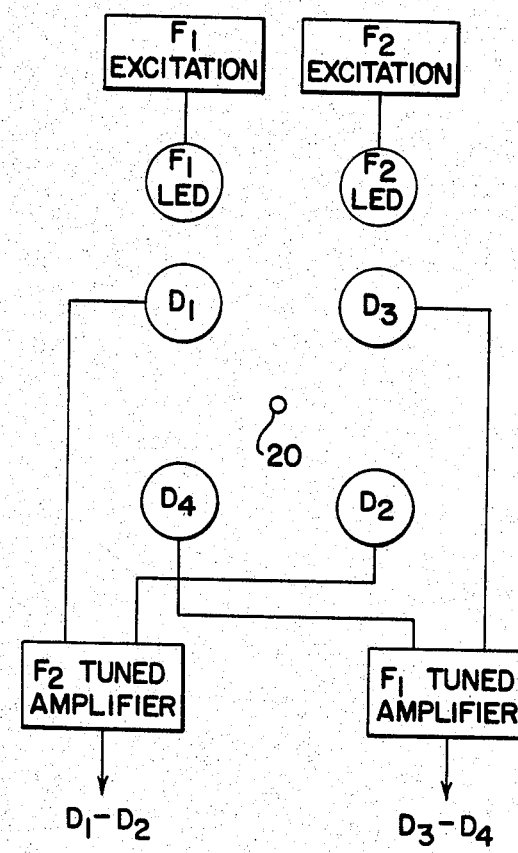
FIG. 7 is a schematic diagram of an electronic control to monitor the fiber alignment system of the apparatus shown in FIG. 1; and, FIGS. 8A–8D are enlarged cross-sectional views of the optical fiber with indicated various coatings.

In the illustrated embodiment, as schematically shown enlarged in FIG. 7, light emitting diodes $F_1$ and $F_2$ create beams of light of controlled frequency and intensity. These beams impinge upon fiber 20. Illuminated fiber 20 passes essentially through and between diametrically opposed tuned solid state silicon diode photo-detectors and photo-multipliers D1, D2, D3 and D4 uniformly spaced at 90° increments about the fiber. Light relected from the coated fiber surface is detected by these devices which convert a light intensity reflected and received to a signal. Variations in the signal act to determine actions which are taken to maintain the center position of the fiber and to reduce or dampen vibrations of the fiber being pulled downwardly through apparatus 30 by pinch rolls 210. Of course, other detecting and controlling arrangements of varying design can be incorporated for adding modulating and controlling features to apparatus 30.

In accordance with this aspect, fiber 20 passes diametrically through integrating photometer 200. Light energy from the drawing operation is transmitted longitudinally and downwardly through vitreous optical fiber 20 and from molten extruder 10. If this light is not shielded by the coating operations, light leaks through uncoated areas and acts as an indication that pin holes or other coating defects exist. Consequently, any light projected through defects in the coating about coated fiber 20 is directed to the inner walls of meter 200. Such light is randomized by diffusion reflection uniformly over the interior area of meter 200. A detector 190 then responds to any light stimulation permitted indicating a defective coating existing in the fiber. Such warning by detector 190 indicates corrective steps must be taken in the coating process functions performed by apparatus 30.

Although not illustrated, it is anticipated that a polymeric coating of a non-conductive, abrasive resistant organic material be electively applied over the plasma deposited coatings. This is best done beyond the pinch rolls 210 and preferably before spooling 250 in accordance with standard polymeric application techniques.

Figure 8A:
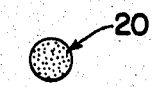
Figure 8B:
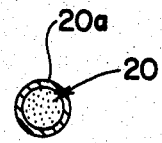
Figure 8C:
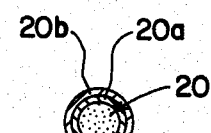
Figure 8D:
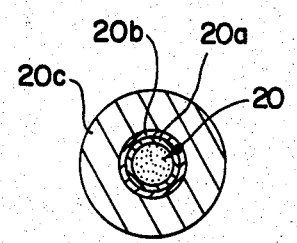

Referring now to more particularly to FIGS. 8A–8D. Fiber 20 as shown in section FIG. 8A is first milled by a plasma beam in zone 35. Thereafter, a diamond-like elemental carbon coating 20a is preferably applied around the outer surface as shown in FIG. 8B. This takes place in zone 70 and the plasma deposited initial coating may be as much as several hundred Angstroms in thickness or as little as about five Angstroms. About coating 20a there is superimposed coating 20b as shown in FIG. 8C. This coating is of a metal including as particularly useful indium, tin, aluminum and gold and can be applied in the plasma metal applying zone 80. Thereafter, the thickness of layer 20b can be electively and substantially increased by molten metal application of micron thick film layer 20c as in zone 100. This latter coating is not by the plasma bombardment and high energy or energetic ion approach as used for the previous coatings. Of course, coating 20a is elective and could be omitted. In this instance, an initial metal would be directly plasma bonded to the surface of fiber 20. Also, various other additions and subtractions of layers are envisioned without departing from the intended spirit and scope of the invention herein disclosed.

Having described the invention, the following is claimed:

1. An apparatus for continuously producing a vitreous optical fiber heremetically sealed in a continuous sheath of elemental material which apparatus comprises: a chamber having an ingress end and an egress end; means for moving said fiber axially through said chamber; means within said chamber at both of said ends for maintaining axial and central alignment of said fiber within said chamber without physical engagement of the fiber by the alignment means; means for creating a vacuum in said chamber; said chamber having first and second vacuum zones sequentially from said ingress toward said egress end and in open communication with one another; means in said first vacuum zone for propelling and directing a plasma of high energy ions against said surface of said fiber in said first vacuum zone whereby said plasma impinges on said surface to move surface imperfections and loose atoms therefrom; positive and negative electrodes of inorganic elemental material in said second vacuum zone and spaced around said fiber; and, means employing a plasma of ions in said second vacuum zone to cause said electrodes to sputter and deposit a first inorganic elemental film of said material on said moving fiber in said second vacuum zone.

2. The apparatus of claim 1 including means forming a third vacuum zone downstream of said second zone, and means in said chamber employing a plasma of ions for depositing a first inorganic elemental metal film on said moving fiber in said third vacuum zone.

3. An apparatus for continuously producing a vitreous optical fiber hermetically sealed in a continuous sheath of elemental material which apparatus comprises: a chamber having an ingress end and an egress end; means for moving said fiber axially through said chamber; means within said chamber at both of said ends for maintaining axial and central alignment of said fiber within said chamber without physical engagement of the fiber by the alignment means; means for creating a vacuum in said chamber; means for propelling and directing a plasma of high energy ions against said surface of said fiber in a first vacuum zone whereby said plasma impinges on said surface to move surface imperfections and loose atoms therefrom; means forming a second vacuum zone downstream of said first zone and in said chamber; means employing a plasma of ions for depositing a first inorganic elemental film on said moving fiber in said second vacuum zone, means in said chamber employing a plasma of ions for depositing a first inorganic elemental metal film on said moving fiber in a third vacuum zone, and vacuum means in a fourth vacuum zone of said chamber for depositing on said first metal film on said moving fiber a similar metal in condensed non-ionic form.

4. The apparatus as defined in claim 3, wherein said condensed form of the metal is as a molten liquid and said contacting means includes means for providing a supply of molten metal along a predetermined path through said chamber and means for passing said moving fiber axially through said supply of molten metal.

* * * * *